(12) United States Patent
Maruyama

(10) Patent No.: US 9,787,600 B2
(45) Date of Patent: Oct. 10, 2017

(54) RELAY DEVICE, SYSTEM, AND NON-TRANSITORY COMPUTER READABLE MEDIUM FOR RELAY SERVICE ACCESS TO HOME AND AWAY CLOUD SERVICES

(71) Applicant: FUJI XEROX CO., LTD., Tokyo (JP)

(72) Inventor: Yasuhiro Maruyama, Kanagawa (JP)

(73) Assignee: FUJI XEROX CO., LTD., Miinato-ku, Tokyo (JP)

( * ) Notice: Subject to any disclaimer, the term of this patent is extended or adjusted under 35 U.S.C. 154(b) by 227 days.

(21) Appl. No.: 14/614,516

(22) Filed: Feb. 5, 2015

(65) Prior Publication Data
US 2015/0271091 A1 Sep. 24, 2015

(30) Foreign Application Priority Data

Mar. 18, 2014 (JP) .................................. 2014-054677

(51) Int. Cl.
| | | |
|---|---|---|
| H04L 12/911 | (2013.01) | |
| H04L 12/14 | (2006.01) | |
| H04L 29/06 | (2006.01) | |

(52) U.S. Cl.
CPC .......... *H04L 47/72* (2013.01); *H04L 12/1457* (2013.01); *H04L 47/78* (2013.01); *H04L 63/08* (2013.01); *H04L 12/1467* (2013.01)

(58) Field of Classification Search
CPC ..... H04L 47/72; H04L 47/78; H04L 12/1457; H04L 63/08
USPC ........................................................ 709/226
See application file for complete search history.

(56) References Cited

U.S. PATENT DOCUMENTS

| | | | | |
|---|---|---|---|---|
| 7,899,166 B1* | 3/2011 | Ravindranath | ......... | H04L 12/14 370/352 |
| 2001/0030952 A1* | 10/2001 | Roy | .................. | H04L 29/06027 370/329 |
| 2002/0018476 A1* | 2/2002 | Roy | ........................ | H04L 29/06 370/401 |
| 2004/0019539 A1* | 1/2004 | Raman | .................... | H04W 4/24 705/29 |
| 2005/0075957 A1* | 4/2005 | Pincus | .................. | G06Q 20/04 705/35 |

(Continued)

FOREIGN PATENT DOCUMENTS

| | | |
|---|---|---|
| JP | 2012-113701 A | 6/2012 |
| JP | 2012-118971 A | 6/2012 |

*Primary Examiner* — Tu Nguyen
(74) *Attorney, Agent, or Firm* — Sughrue Mion, PLLC

(57) ABSTRACT

A relay device includes the following elements. A use request receiver receives a use request to use a service to be provided by a service providing device from a client device. An allocation request sender sends an allocation request to allocate a usage amount of the service based on a usage amount indicated by usage amount information specified by the use request received by the use request receiver to a different relay device. An allocated amount receiver receives allocated amount information indicating an allocated usage amount for the service sent from the different relay device in response to the allocation request. A return information generator generates return information from the allocated amount information received from the allocated amount receiver and a usage amount of the service. A return information sender sends the return information generated by the return information generator to the different relay device.

16 Claims, 11 Drawing Sheets

(56) References Cited

U.S. PATENT DOCUMENTS

| | | | |
|---|---|---|---|
| 2005/0086141 A1* | 4/2005 | Lewis | G06Q 40/00 705/35 |
| 2007/0217581 A1* | 9/2007 | Dai | H04L 12/14 379/114.2 |
| 2008/0147551 A1* | 6/2008 | Connelly | G06Q 20/10 705/44 |
| 2010/0005023 A1* | 1/2010 | Bayne | G06Q 40/02 705/39 |
| 2012/0113471 A1 | 5/2012 | Shimada et al. | |
| 2015/0156334 A1* | 6/2015 | Chai | H04L 12/1467 455/406 |

* cited by examiner

FIG. 4

| ACCOUNT INFORMATION | | EMAIL ADDRESS | LANGUAGE | ORGANIZATION ID | TOKEN | | |
|---|---|---|---|---|---|---|---|
| USER ID | PASSWORD | | | | SERVICE PROVIDING DEVICE 10A | SERVICE PROVIDING DEVICE 10B | SERVICE PROVIDING DEVICE 10C |
| user01 | password 01 | user01@aaa.example.com | JAPANESE | ... | TOKEN A01 | TOKEN B01 | — |
| user02 | password 02 | user02@aaa.example.com | JAPANESE | ... | TOKEN A02 | TOKEN B02 | TOKEN C02 |
| ⋮ | ⋮ | ⋮ | ⋮ | ⋮ | ⋮ | ⋮ | ⋮ |

FIG. 5

| ORGANIZATION ID | SERVICE ID | MAXIMUM USAGE AMOUNT (NUMBER OF SHEETS) | USER ID LIST | EXPIRY DATE | AWAY ALLOCATION LIST |
|---|---|---|---|---|---|
| department01 | CHARACTER RECOGNITION | 150 | user01<br>user02<br>user03<br>⋮ | MARCH 31, 2014 | region02: 10<br>region03: 20 |
| | FORMAT CONVERSION | 200 | user01<br>user02<br>user03<br>⋮ | APRIL 10, 2014 | — |
| department02 | CHARACTER RECOGNITION | 300 | user21<br>user22 | ⋮ | — |
| | ⋮ | ⋮ | ⋮ | ⋮ | — |
| ⋮ | | ⋮ | ⋮ | ⋮ | — |

FIG. 6

| ACCOUNT INFORMATION | | EMAIL ADDRESS | LANGUAGE | ORGANIZATION ID | TOKEN 311 | | | EXPIRY DATE | HOME INFORMATION |
|---|---|---|---|---|---|---|---|---|---|
| USER ID | PASSWORD | | | | SERVICE PROVIDING DEVICE 10A | SERVICE PROVIDING DEVICE 10B | SERVICE PROVIDING DEVICE 10C | | |
| user35 | password35 | user35@aaa.example.com | ENGLISH | ... | TOKEN A35 | TOKEN B35 | — | MARCH 31, 2014 | region03 |
| user38 | password38 | user38@aaa.example.com | JAPANESE | ... | — | — | TOKEN C38 | APRIL 10, 2014 | region02 |
| ... | ... | ... | ... | ... | ... | ... | ... | ... | ... |

FIG. 7

| ORGANIZATION ID | SERVICE ID | USER ID LIST | ALLOCATED AMOUNT (NUMBER OF SHEETS) | EXPIRY DATE | HOME INFORMATION | ENABLE FLAG |
|---|---|---|---|---|---|---|
| department08 | CHARACTER RECOGNITION | user51 user52 user53 ⋮ | 30 | MARCH 31, 2014 | region02 | ENABLE |
| | FORMAT CONVERSION | user51 user52 user53 ⋮ | 50 | APRIL 10, 2014 | | ENABLE |
| department39 | CHARACTER RECOGNITION | user61 user62 | 100 | MAY 10, 2014 | region03 | ENABLE |
| | ⋮ | ⋮ | ⋮ | ⋮ | | ⋮ |
| ⋮ | | ⋮ | ⋮ | ⋮ | ⋮ | ⋮ |

312

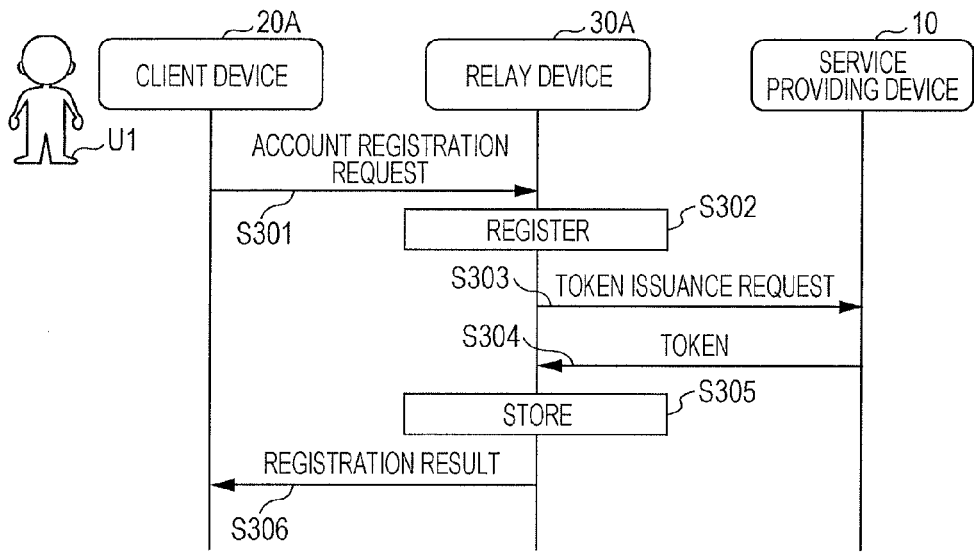
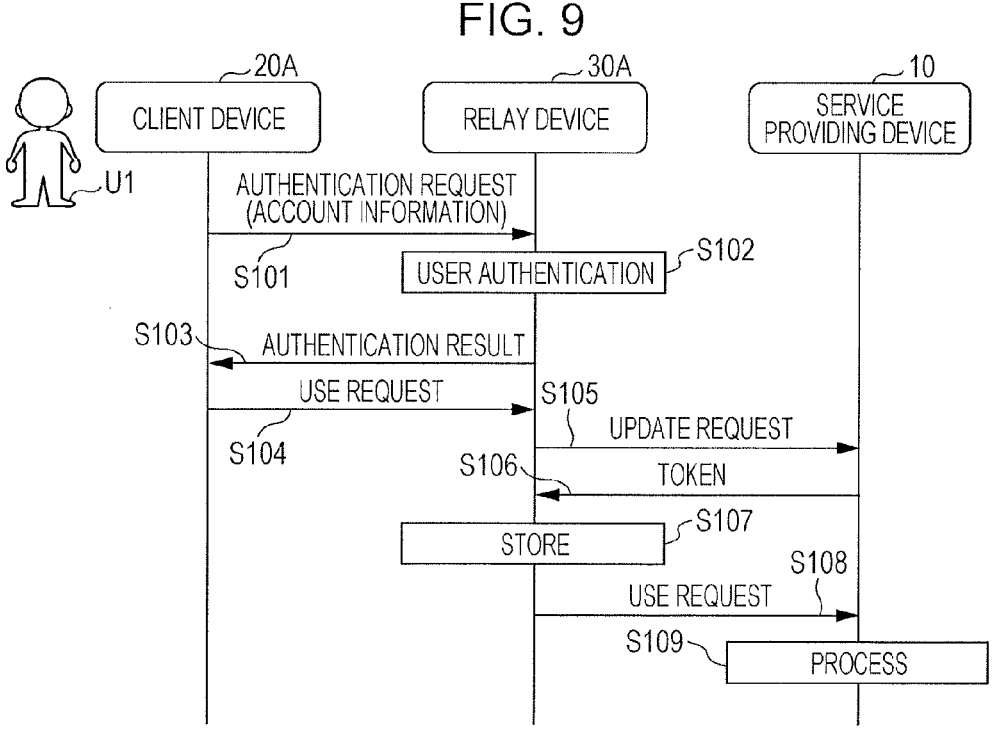

RELAY DEVICE, SYSTEM, AND NON-TRANSITORY COMPUTER READABLE MEDIUM FOR RELAY SERVICE ACCESS TO HOME AND AWAY CLOUD SERVICES

CROSS-REFERENCE TO RELATED APPLICATIONS

This application is based on and claims priority under 35 USC 119 from Japanese Patent Application No. 2014-054677 filed Mar. 18, 2014.

BACKGROUND (i) Technical Field

The present invention relates to a relay device, a system, and a non-transitory computer readable medium.

(ii) Related Art

When using a server device on a network, the server device may be accessed via a relay device.

SUMMARY

According to an aspect of the invention, there is provided a relay device including: a use request receiver that receives a use request to use a service to be provided by a service providing device from a client device; an allocation request sender that sends an allocation request to allocate a usage amount of the service based on a usage amount indicated by usage amount information specified by the use request received by the use request receiver to a different relay device; an allocated amount receiver that receives allocated amount information indicating an allocated usage amount for the service sent from the different relay device in response to the allocation request; a return information generator that generates return information from the allocated amount information received from the allocated amount receiver and a usage amount of the service; and a return information sender that sends the return information generated by the return information generator to the different relay device.

BRIEF DESCRIPTION OF THE DRAWINGS

An exemplary embodiment of the present invention will be described in detail based on the following figures, wherein:

FIG. 4 illustrates an example of a user management table;

FIG. 5 illustrates an example of a service use management table;

FIG. 6 illustrates an example of a first cache table;

FIG. 7 illustrates an example of a second cache table; and

FIGS. 8 through 14 are sequence diagrams illustrating examples of operations performed by the system.

DETAILED DESCRIPTION

1. Configuration

Figure 1:
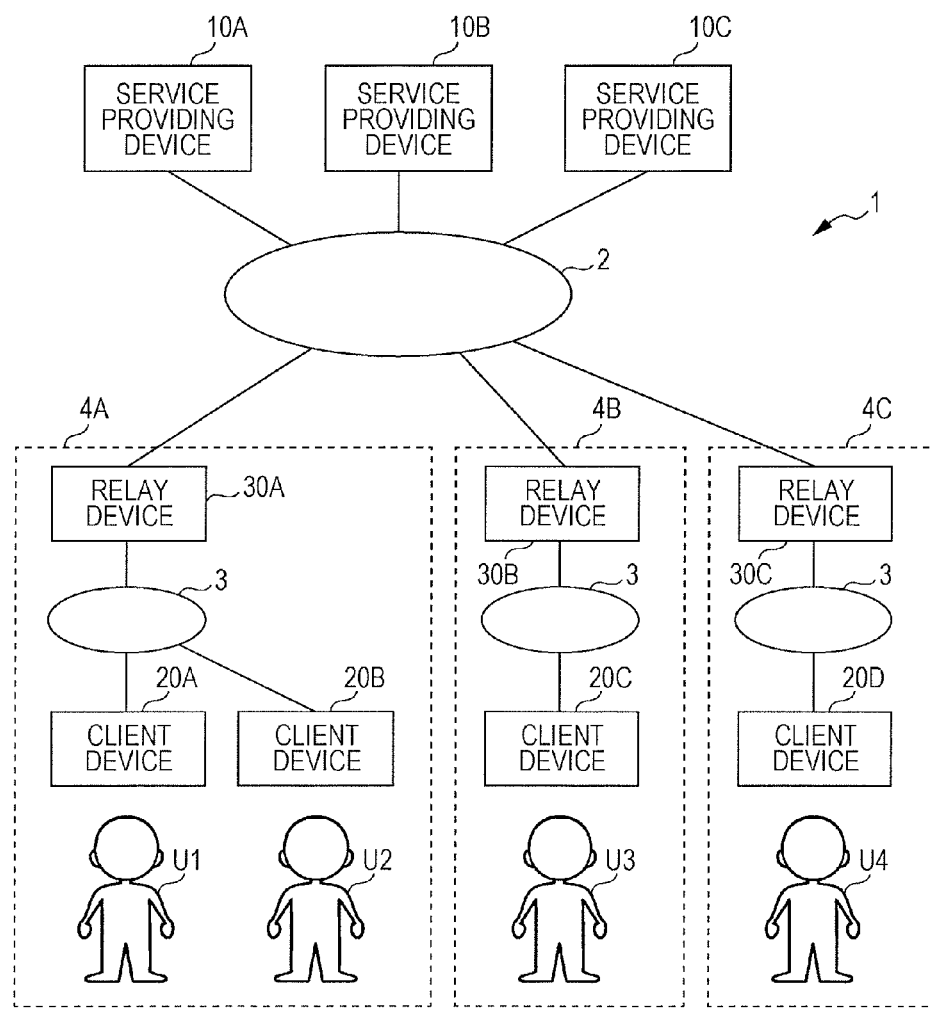
FIG. 1 is a diagram illustrating an example of the overall configuration of a system.

FIG. 1 is a diagram illustrating an example of the overall configuration of a system 1 according to an exemplary embodiment. The system 1 includes service providing devices 10A through 10C, client devices 20A through 20D, and relay devices 30A through 30C. In the following description, unless it is necessary to distinguish the service providing devices 10A through 10C from each other, they will be collectively referred to as the "service providing device 10" or "service providing devices 10". Similarly, unless it is necessary to distinguish the client devices 20A through 20D from each other, they will be collectively referred to as the "client device 20" or "client devices 20", and unless it is necessary to distinguish the relay devices 30A through 30C from each other, they will be collectively referred to as the "relay device 30" or "relay devices 30". The service providing device 10 and the relay device 30 are connected to each other via a communication network 2, such as the Internet. The client device 20 is connected to the communication network 2 via a communication network 3, such as the Internet or a local area network (LAN), and the relay device 30. The client device 20 may be directly connected to the communication network 2 without passing through the communication network 3 and the relay device 30.

The service providing device 10 provides various services, such as a data storage service. These services may be so-called cloud services. In order to access the service providing device 10, the client device 20 requires a token (an example of authorization information) representing authorization to access the service providing device 10. In this example, a token has a data structure in which account identification information and authorization are described. The client device 20 is, for example, an image processing device, and is used by a user when using a service provided by the service providing device 10. The client device 20 may have plural functions, such as a scanner function, a copy function, a print function, and a fax function. The relay device 30 has a function of relaying data between the client device 20 and the service providing device 10.

In this example, locations where the client devices 20 are installed are divided into plural regions 4A, 4B, and 4C. The relay device 30A relays data between the client devices 20A and 20B installed in the region 4A and the service providing devices 10. The relay device 30B relays data between the client device 20C installed in the region 4B and the service providing devices 10. The relay device 30C relays data between the client device 20D installed in the region 4C and the service providing devices 10. In the following description, unless it is necessary to distinguish the regions 4A through 4C from each other, they will be collectively referred to as the "region 4" or "regions 4".

A user of the system 1 belongs to one of the regions 4. For the sake of description, the region 4 to which a user belongs will be called a "home" region of this user and a region to which the user does not belong will be called an "away" region. In this example, for users U1 and U2, the region 4A is a home region, and the regions 4B and 4C are away regions. Normally, a user performs various operations by using the client device 20 installed in the home region 4 of this user. In the relay device 30 installed in the home region 4 of a user, information concerning this user (user information), such as user account information, is registered. The relay device 30 performs processing, such as user authentication, on the basis of user information registered in the relay device 30. In the following description, unless it is necessary to distinguish users U1 through U4 from each other, they will be collectively referred to as the "user U" or "users U".

Figure 2:
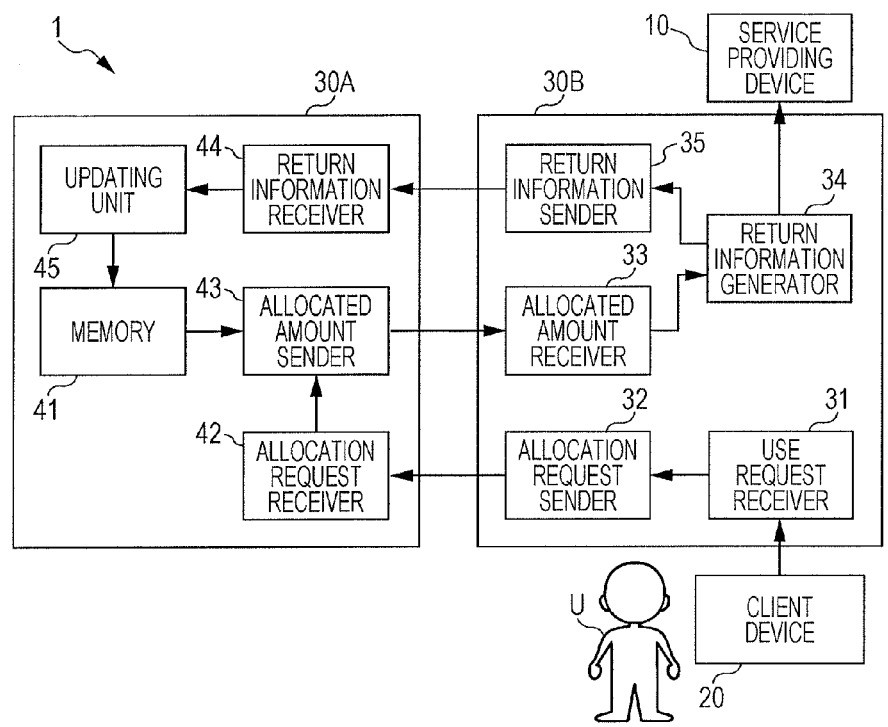
FIG. 2 is a block diagram illustrating an example of the functional configuration of the system.

FIG. 2 is a block diagram illustrating an example of the functional configuration of the system 1. The system 1 includes a service providing device 10, a client device 20, and relay devices 30A and 30B. The relay device 30A is a relay device installed in the home region 4 of a user U (an example of a second relay device). The relay device 30B is a relay device installed in an away region of the user U (an example of a first relay device). The relay device 30B includes a use request receiver 31, an allocation request sender 32, an allocated amount receiver 33, a return information generator 34, and a return information sender 35. The use request receiver 31 receives a use request to use a service to be provided by the service providing device 10 from the client device 20. The allocation request sender 32 sends an allocation request to allocate a usage amount of service to the relay device 30A. The usage amount of service is based on usage amount information specified by the use request received by the use request receiver 31. The allocated amount receiver 33 receives allocated amount information indicating an allocated usage amount of service sent from the relay device 30A in response to the allocation request sent by the allocation request sender 32. The return information generator 34 generates return information from the allocated amount information received by the allocated amount receiver 33 and a usage amount of the service. The return information sender 35 sends the return information generated by the return information generator 34 to the relay device 30A.

The relay device 30A includes a memory 41, an allocation request receiver 42, an allocated amount sender 43, a return information receiver 44, and an updating unit 45. The memory 41 stores therein usage amount information indicating a usage amount of service which is permitted to be relayed. The allocation request receiver 42 receives an allocation request to allocate a usage amount of service from the relay device 30B. The allocated amount sender 43 sends allocated amount information indicating the entirety or part of a maximum usage amount represented by the usage amount information stored in the memory 41 to the relay device 30B in response to the allocation request received by the allocation request receiver 42. The return information receiver 44 receives return information from the relay device 30B. The updating unit 45 updates the maximum usage information stored in the memory 41 in accordance with the return information received by the return information receiver 44.

Figure 3:
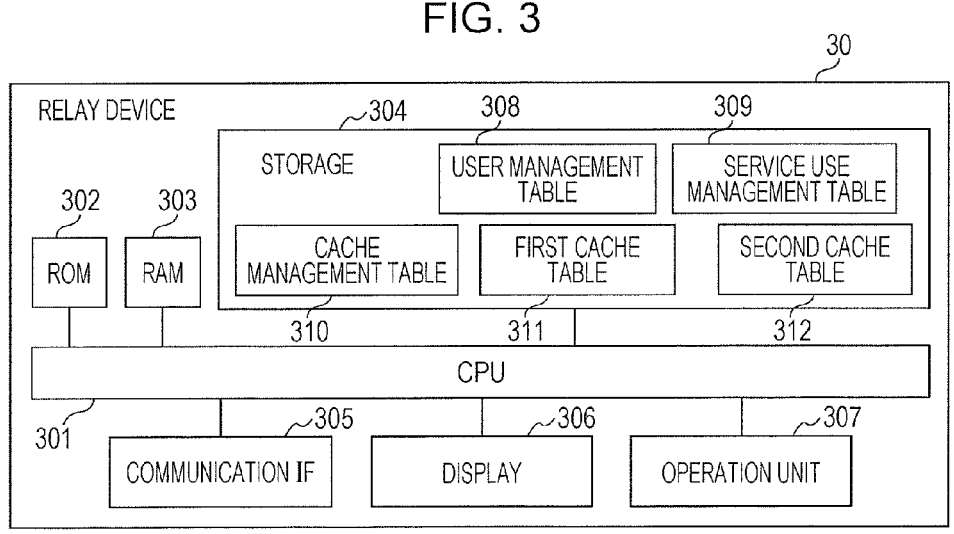
FIG. 3 is a block diagram illustrating an example of the hardware configuration of a relay device.

FIG. 3 is a block diagram illustrating an example of the hardware configuration of the relay device 30. The relay device 30 is a computer including a central processing unit (CPU) 301, a read only memory (ROM) 302, a random access memory (RAM) 303, a storage 304, a communication interface (IF) 305, a display 306, and an operation unit 307. The CPU 301 is a controller (processor) which controls the individual elements of the relay device 30. The ROM 302 is a non-volatile storage unit storing a program and data. The RAM 303 is a volatile primary storage unit which serves as a work area used for the CPU 301 executing a program. The storage 304 is a non-volatile secondary storage unit storing a program and data. The communication IF 305 is an interface through which the relay device 30 performs communication via the communication network 2. In this example, the communication IF 305 is particularly an interface through which the relay device 30 performs communication with the service providing device 10 and the client device 20.

In this example, as a result of the CPU 301 executing a relay program stored in the storage 304 or the ROM 302, the functions shown in FIG. 2 are implemented. The CPU 301 executing the relay program or the CPU 301 and the communication IF 305 are an example of the use request receiver 31, the allocation request sender 32, the allocated amount receiver 33, the return information generator 34, the return information sender 35, the allocation request receiver 42, the allocated amount sender 43, and the return information receiver 44. The CPU 301 is an example of the updating unit 45. The storage 304 is an example of the memory 41.

The storage 304 includes a user management table 308, a service use management table 309, a cache management table 310, a first cache table 311, and a second cache table 312. The user management table 308, the service use management service 309, and the cache management table 310 are tables which are referred to when the relay device 30 operates as a home relay device. The first and second cache tables 311 and 312 are tables which are referred to when the relay device 30 operates as an away relay device.

The user management table 308 is a table used for managing information concerning users (user information). In the user management table 308, user information concerning users belonging to the region 4 of the relay device 30 is registered. That is, user information registered in the user management table 308 differs among the relay devices 30. In the example shown in FIG. 1, user information concerning the user U1 and user information concerning the user U2 are registered in the user management table 308 of the relay device 30A, but not in the user management tables 308 of the relay devices 30B and 30C. User information concerning the user U3 is registered in the user management table 308 of the relay device 30B, but not in the user management tables 308 of the relay devices 30A and 30C. User information concerning the user U4 is registered in the user management table 308 of the relay device 30C, but not in the user management tables 308 of the relay devices 30A and 30B.

FIG. 4 illustrates an example of the user management table 308. In the user management table 308, account information, email address, language, organization ID, token issued by each service providing device 10 are stored in association with each other. The account information is information necessary for logging in to the relay device 30. The account information includes a user ID and a password. The email address is an email address assigned to a user. The language is a language used by a user. The organization ID is information concerning an organization (department) to which a user belongs. The user ID included in the account information may be an email address assigned to a user.

The token is information indicating authorization to access the service providing device 10. The token is issued for each user by the service providing device 10 and is stored in the user management table 308. In this example, a token A01, which is a token issued by the service providing device 10A, and a token B01, which is a token issued by the service providing device 10B, are stored in association with the user ID "user01". A token stored in the user management table 308 includes information indicating the expiry date of this token and information indicating the content of access authorization (such as, only data reference is permitted or data reference and updating is permitted). For each token, the expiry date is preset by the service providing device 10, and when the effective period indicated by the expiry date has expired, this token can no longer be used. If the effective period has expired, the relay device 30 in which account information concerning the user of this token is registered requests the service providing device 10 to update this token and the service providing device 10 issues a new token.

The service use management table 309 is a table for managing the use of services for which the maximum usage amount is set, among services provided by the service providing device 10. Services for which the maximum usage amount is set are, for example, charged services. In this example, for a user to use a service provided by the service providing device 10, it is necessary to purchase a service use authorization in advance. In this example, a service use authorization is purchased by an organization to which a user belongs. The service use authorization indicates the number of times a service can be used (maximum usage amount). The service use authorization indicates, for example, the number of times a service for performing document character recognition processing can be used, the number of times a service for converting the format of data can be used, and the number of times a service for performing image forming processing can be used. Alternatively, the maximum usage amount may be indicated by a balance of money, and a service may be used within this balance.

FIG. 5 illustrates an example of the service use management table 309. In the service use management table 309, the organization ID, service ID, maximum usage amount, user ID list, expiry date, and away allocation list are stored in association with each other. The organization ID is information indicating an organization to which a user belongs. The service ID is information indicating a service provided by the service providing device 10. The maximum usage amount is a remaining maximum usage amount of service of a service use authorization purchased by an organization. The maximum usage amount is, for example, the number of times a service can be used or the number of sheets by which a service can be used. Alternatively, the maximum usage amount may be indicated by a balance of money, and the unit price may be set for each service. Then, every time a service is used, the unit price for this service is deducted from the balance of money so as to update the balance. The user ID list is a list of users that may use a service. The expiry date indicates a period for which the use of a service is effective. The away allocation list is a list of usage amounts allocated to away regions if the usage amount is allocated to an away region. Allocation processing for allocating a usage amount will be discussed later, and a detailed description thereof is omitted here.

The first cache table 311 is a table used when a relay device 30 operates as an away relay device 30. In the first cache table 311, user information concerning a user using this away relay device 30 is temporarily stored. In this example, if the user U1 is away, for example, due to a business trip, and performs various operations by using the client device 20C, the relay device 30B serves as an away relay device to relay data between the client device 20C and the service providing device 10. In this case, the away relay device 30B obtains the user information from the home relay device 30A and temporarily stores the obtained user information in the first cache table 311.

FIG. 6 illustrates an example of the first cache table 311. In the first cache table 311, the expiry date and home information, as well as account information, email address, language, organization ID, token issued by each service providing device 10, are stored in association with each other. The account information, email address, language, organization ID, and token are similar to those stored in the user management table 308. The expiry date indicates a period for which user information is effective. The expiry date of user information is set by, for example, the relay device 30. The CPU 301 of the relay device 30 deletes user information for which the effective period indicated by the expiry date has expired from the first cache table 311. Home information is information indicating the home region of a user indicated by user information. In this example, the home information is information for identifying the relay device 30A corresponding to the home region of a user.

The cache management table 310 is a table for managing the status of the service use by a user indicated by user information stored in the user management table 308 of a home relay device in another relay device 30. In this example, in the cache management table 310, the user ID of the user information stored in the first cache table 311 of an away relay device 30 is stored in association with the expiry date and an away list. The expiry date is a period set by the relay device 30. The away list is a list of items of identification information for identifying relay devices 30 in which this user information is temporarily stored. If the user ID is stored in the cache management table 310, it means that a copy of the user information corresponding to this user ID is also stored in the first cache table 311 of another relay device 30. In the cache management table 310, not only the user ID, but also other items of user information may be stored.

FIG. 7 illustrates an example of the second cache table 312. The second cache table 312 is a table for managing allocated amount information indicating a usage amount of service allocated to the relay device 30B which operates as an away relay device. In the second cache table 312, the organization ID, service ID, user ID list, allocated amount, expiry date, home information, and enable flag are stored in association with each other. The organization ID, service ID, and user ID list are similar to those stored in the service use management table 309. The allocated amount is a usage amount of service allocated to the relay device 30B. The expiry date indicates an effective period for which an allocated amount of service can be used. The expiry date is set by the CPU 301 of the relay device 30 according to the predetermined rules. The home information is information for identifying the relay device 30 which has allocated the usage amount of service. That is, the home information is information for identifying the region corresponding to the organization of the user. The enable flag is referred to when performing return processing for allocated amount information, which will be discussed later. For the sake of description, user information stored in the first cache table 311 and allocated amount information stored in the second cache table 312 will be referred to as "cache information".

A detailed explanation of the hardware configuration of the service providing device 10 and the client device 20 will be omitted. The service providing device 10 is a computer including a CPU, a ROM, a RAM, a storage, and a communication IF. The client device 20 is an image forming device including a CPU, a ROM, a RAM, a storage, an operation unit, a display, an image reader, and an image forming unit.

2. Operations

Operations performed by the system 1 will be described below. Normally, a user uses the client device 20 installed in the home region of the user. The user first registers an account in the relay device 30 of the home region by using the client device 20 installed in the home region. Then, when using a service provided by the service providing device 10, the user accesses the service providing device 10 by using the client device 20 installed in the home region. There may be a case, however, in which the user is temporarily moved to an away region, for example, due to a business trip. In this case, the user uses a service by using the client device 20 installed in the away region. A description will now be given of an operation for registering an account in the relay device 30, an operation for using a service by using the client device 20 installed in a home region, an operation for obtaining and updating user information by using the client device 20 installed in an away region, and an operation for using a service by using the client device 20 installed in an away region.

2-1. Account Registering Operation

FIG. 8 is a sequence diagram illustrating an operation for registering an account in a relay device 30 by a user. In this example, the user U1 registers an account in the relay device 30A in the region 4A, which is a home region of the user U1, by using the client device 20A. The user U1 first sends an account registration request to the relay device 30A by using the client device 20A. More specifically, the user U1 inputs account information for registering an account into the relay device 30A by operating the operation unit of the client device 20A. For example, the user U1 inputs "user01" as the user ID and "password01" as the password. The user U1 may also input the user's email address, language, and/or organization ID.

In step S301, the client device 20 sends an account registration request including user information, such as account information, input by the user U1 to the relay device 30A. In step S302, the CPU 301 of the relay device 30A registers the account information included in the account registration request in the relay device 30A. That is, the CPU 301 stores the account information included in the account registration request in the user management table 308.

In step S303, the CPU 301 requests the service providing device 10 to issue a token necessary for using a service provided by the service providing device 10. The service providing device 10 receives a request to issue a token from the relay device 30A. In step S304, the service providing device 10 issues a token and sends it to the relay device 30A. The relay device 30A receives the token from the service providing device 10. In step S305, the CPU 301 of the relay device 30A stores the received token in the user management table 308 in association with the user ID of the user U1. In step S306, the CPU 301 informs the client device 20A that registration of the account has been successfully completed.

2-2. Operation for Using Service in Home Region

FIG. 9 is a sequence diagram illustrating an operation for using a service by a user using the client device 20. In this example, the user U1 belonging to the region 4A uses a service by using the client device 20A. The user U1 first logs in to the relay device 30A by using the client device 20A. More specifically, the user U1 inputs account information for logging in to the relay device 30A by operating the operation unit of the client device 20A. For example, if the account information for logging in to the relay device 30A is constituted by a user ID "user01" and a password "password01", the user U1 inputs this user ID and this password.

In step S101, the client device 20A sends an authentication request including the account information input by the user to the relay device 30A. In step S102, the CPU 301 of the relay device 30A performs user authentication in accordance with the authentication request received from the client device 20A. More specifically, the CPU 301 of the relay device 30A performs user authentication according to whether or not the account information included in the authentication request is stored in the user management table 308. If the account information included in the authentication request is stored in the user management table 308, user authentication succeeds. On the other hand, if the account information included in the authentication request is not stored in the user management table 308, user authentication fails. In this example, since the account information of the user U1 is stored in the user management table 308, user authentication succeeds. In step S103, the CPU 301 sends an authentication result of user authentication performed in step S102 to the client device 20A.

If the client device 20A receives an authentication result indicating that user authentication has succeeded, it proceeds to step S104. If the client device 20A receives an authentication result indicating that user authentication has failed, it terminates the processing. In this example, the client device 20A receives an authentication result indicating that user authentication has succeeded and thus proceeds to step S104.

In step S104, the client device 20A sends a use request to use a service provided by the service providing device 10 to the relay device 30A. This use request includes the user ID of the user U1 and information indicating the type of service provided by the service providing device 10. The CPU 301 of the relay device 30A receives the use request from the client device 20A. The CPU 301 reads a token corresponding to the user ID included in the received use request from the user management table 308. In this case, the CPU 301 checks the expiry date of the read token and, if the effective period indicated by the expiry date has expired, the CPU 301 requests the service providing device 10 to update the token in step S305. The service providing device 10 issues a new token in response to the update request from the relay device 30A. In step S106, the service providing device 10 sends the issued token to the relay device 30A. The CPU 301 of the relay device 30A receives the updated token from the service providing device 10. In step S107, the CPU 301 stores the received token in the user management table 308. If the effective period indicated by the expiry date of the token has not yet expired, steps S105 through S107 are not executed.

In step S108, the CPU 301 sends a use request to the service providing device 10 by using the updated token. That is, the CPU 301 sends the updated token and the use request received from the client device 20A in step S104 to the service providing device 10. The service providing device 10 receives the use request and token, and then determines by using the token whether or not access to the service providing device 10 will be permitted. If it is determined that access to the service providing device 10 will be permitted, in step S109, the service providing device 10 performs processing in response to the received use request. For example, the service providing device 10 performs processing concerning a service according to the service type included in the received use request.

2-3. Operation for Obtaining User Information in Away Region

The operation for obtaining user information from an away client device 20 by a user will be described below.

Figure 10:
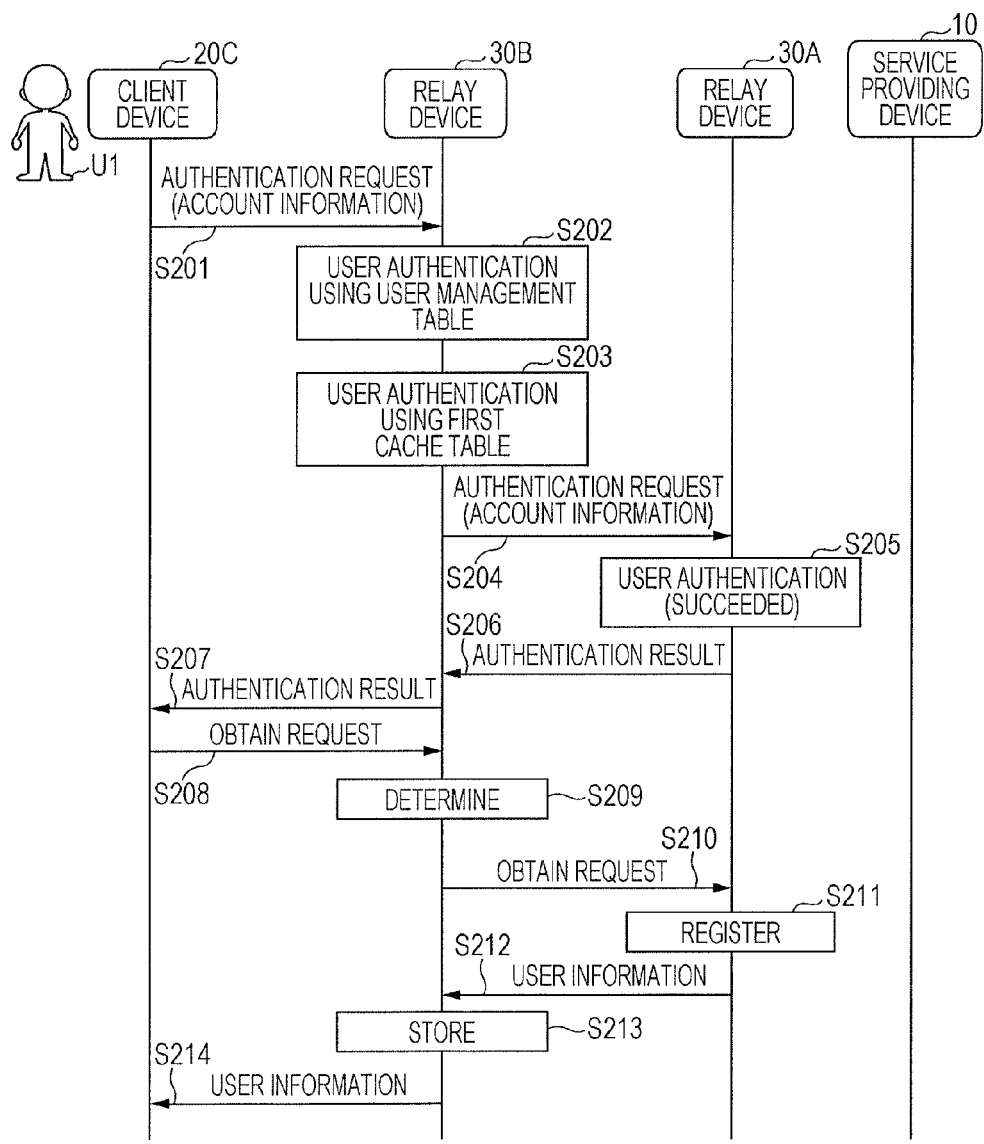

FIG. 10 is a sequence diagram illustrating an operation for referring to user information from an away client device 20 by a user. In this example, the user U1 belonging to the region 4A refers to the user information concerning the user U1 by using the away client device 20C. As stated above, the user information concerning a user is stored only in the home relay device 30 of the user, but not in away relay devices. That is, the user information concerning the user U1 is not stored in the user management table 308 of the relay device 30B. In this example, the user information of the user U1 is not stored in the first cache table 311 of the relay device 30B, either.

The user U1 first logs in to the relay device 30B by using the client device 20C. More specifically, the user U1 inputs account information for logging in to the relay device 30B by operating the operation unit of the client device 20C. For example, if the account information for logging in to the relay device 30A is constituted by a user ID "user01" and a password "password01", the user U1 inputs this user ID and this password.

In step S201, the client device 20C sends an authentication request including the account information input by the user to the relay device 30B. In step S202, the CPU 301 of the relay device 30B performs user authentication in response to the authentication request received from the client device 20C. More specifically, the CPU 301 of the relay device 30B performs user authentication according to whether or not the account information included in the authentication request is stored in the user management table 308. In this example, since the user information concerning the user U1 is not stored in the user management table 308 of the relay device 30B, user authentication fails.

If user authentication has failed in step S202, in step S203, the CPU 301 of the relay device 30B performs user authentication according to whether or not the account information included in the received authentication request is stored in the first cache table 311. If the account information is stored in the first cache table 311, user authentication succeeds. If the account information is not stored in the first cache table 311, user authentication fails. In this example, since the user information concerning the user U1 is not stored in the first cache table 311 of the relay device 30B, user authentication fails.

If user authentication has failed in step S203, the CPU 301 of the relay device 30B sends an authentication request to all of the other relay devices 30 and specifies the home relay device 30A of the user U1 on the basis of responses to the authentication request. In this example, in step S204, the CPU 301 sends the authentication request received from the client device 20C to all of the other relay devices 30, that is, the relay devices 30A and 30C. For avoiding the complexity of the drawing, the relay device 30C is not shown in FIG. 10.

The CPU 301 of the relay device 30A receives the authentication request from the relay device 30B. In step S205, the CPU 301 of the relay device 30A performs user authentication in response to the received authentication request. In this example, since the user information concerning the user U1 is stored in the user management table 308 of the relay device 30A, user authentication succeeds. In step S206, the CPU 301 of the relay device 30A sends an authentication result indicating that user authentication has succeeded to the relay device 30B. Concerning the relay device 30C, since user information concerning the user U1 is not stored in the user management table 308 of the relay device 30C, user authentication fails in the relay device 30C. The CPU 301 of the relay device 30C sends an authentication result indicating that user authentication has failed to the relay device 30B.

The CPU 301 of the relay device 30B receives authentication results from the relay devices 30A and 30C. Since an authentication result indicating that user authentication has succeeded is received from the relay device 30A, in step S207, the CPU 301 of the relay device 30B sends an authentication result indicating that user authentication has succeeded to the client device 20C. If the client device 20C receives an authentication result indicating that user authentication has succeeded, it proceeds to step S208. If the client device 20C receives an authentication result indicating that user authentication has failed, it terminates the processing. In this example, the client device 20C receives an authentication result indicating that user authentication has succeeded and thus proceeds to step S208.

In step S208, the client device 20C sends a request to obtain user information to the relay device 30B. This request includes the user ID of the user U1. The CPU 301 of the relay device 30B receives a request to obtain user information from the client device 20C. In step S209, the CPU 301 of the relay device 30B determines whether or not effective user information corresponding to the user ID included in the received request is stored in the first cache table 311 of the relay device 30B. In this case, a determination as to whether or not user information is effective is made on the basis of the expiry date of the user information stored in the first cache table 311.

If the user information corresponding to the user ID included in the request is not stored in the first cache table 311, or even if it is stored, if it is not effective, the CPU 301 of the relay device 30B sends a request to obtain user information to the home relay device 30A of the user of the user ID included in the request. The home relay device 30A is a relay device 30 that has sent an authentication result indicating that user authentication has succeeded in step S206. That is, in step S210, the CPU 301 of the relay device 30B sends a request to obtain user information to the home relay device 30A of the user U1. This request includes the user ID included in the request received from the client device 20C.

In step S211, the CPU 301 of the relay device 30A registers the user ID included in the request received from the relay device 30B, predetermined effective period, identification information for identifying the relay device 30B included in the request received from the relay device 30B in the cache management table 310. The CPU 301 of the relay device 30A also reads the user information corresponding to the user ID included in the request received from the relay device 30B from the user management table 308. In step S212, the CPU 301 of the relay device 30A sends the read user information to the relay device 30B.

The relay device 30B receives the user information from the relay device 30A. In step S213, the CPU 301 of the relay device 30B sets the expiry date for the received user information and stores it in the first cache table 311. The CPU 301 of the relay device 30B also stores home information indicating the home region of the user indicated by the received user information in the first cache table 311. In step S214, the CPU 301 of the relay device 30B sends the received user information to the client device 20C. The client device 20C receives the user information and performs processing instructed by the user U1 by using the received user information.

In step S212, the user information concerning the user U1 is stored in the first cache table 311 of the relay device 30B. Accordingly, if the user U1 reattempts to obtain the user information by using the away client device 20C, the user information stored in the first cache table 311 is used. More specifically, when performing user authentication in step S203 of FIG. 10, since the user information concerning the user U1 is stored in the first cache table 311 of the relay device 30B, user authentication succeeds. Accordingly, steps S204 through S206 are skipped. In this case, the CPU 301 updates (extends) the expiry date of the user information concerning the user U1 on the basis of the predetermined rules. If the user information concerning the user U1 is stored in the first cache table 311, steps S210 through S212 are also skipped. Updating processing for the expiry date of the user information may be executed when performing authentication processing in step S203 or determination processing in step S209.

If, every time the user U1 uses a service by using an away client device 20, the user U1 obtains user information concerning the user U1 from the home relay device 30A, it takes a lot of time due to, for example, communications, thereby decreasing the performance. In contrast, in this exemplary embodiment, user information is cached in the away relay device 30B as cache information, and the home relay device 30A manages the usage status of the cache information in the away relay device 30B.

2-4. Operation for Updating User Information in Away Region

The operation for updating user information from an away client device 20 by a user will be described below. This operation continues from the operation for obtaining user information shown in FIG. 10.

Figure 11:
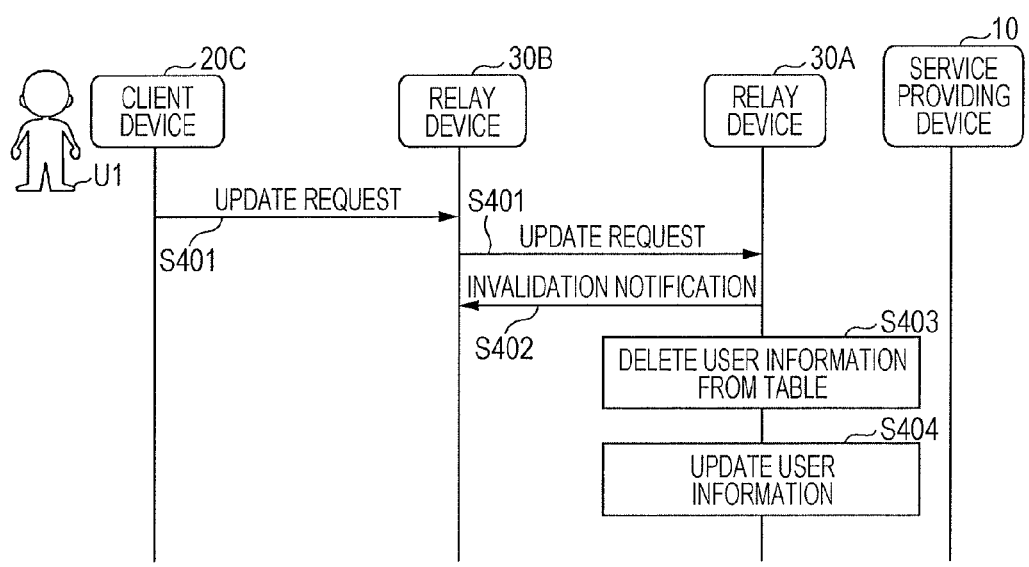

FIG. 11 is a sequence diagram illustrating an operation for updating user information by the user U1 using the away client device 20C. The user U1 changes user information, for example, the password of the account information, by using the operation unit of the client device 20C. In step S401, the client device 20C sends an update request including changed user information to the relay device 30B. This update request includes the user ID of the user U1. The relay device 30B receives the update request from the client device 20C. In step S401, the relay device 30B forwards the update request received from the client device 20C to the home relay device 30A of the user U1.

The relay device 30A receives the update request from the relay device 30B. The CPU 301 of the relay device 30A checks whether or not user information of the user U1 is registered in the cache management table 310. If user information of the user U1 is registered in the cache management table 310, the relay device 30A informs the other relay devices 30 that cache information has been invalidated. On the other hand, if user information of the user U1 is not registered in the cache management table 310, the relay device 30A skips steps S402 through S404.

In this example, in step S211 of FIG. 10, the user information concerning the user U1 is registered in the cache management table 310. Accordingly, in step S402, the CPU 301 of the relay device 30A informs the relay devices 30B and 30C that the cache information has been invalidated. In step S403, the CPU 301 of the relay device 30A deletes the user information concerning the user U1 from the cache management table 310.

In step S404, the CPU 301 of the relay device 30A updates the user information stored in the user management table 308 in response to the update request received in step S401.

2-5. Operation for Using Service in Away Region

The operation for using a service by a user using an away client device 20 will be described below.

Figure 12:
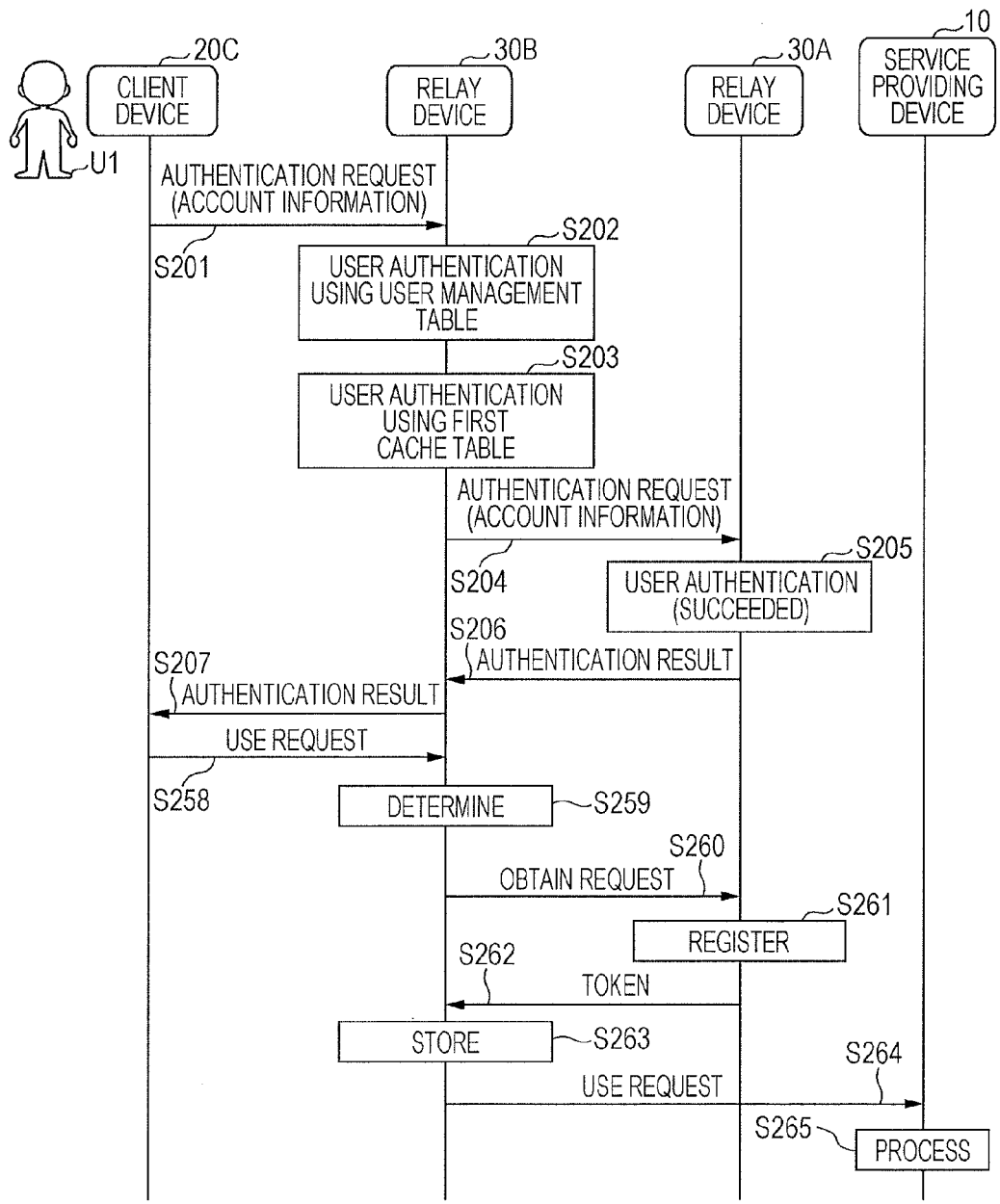

FIG. 12 is a sequence diagram illustrating an operation for using a service provided by the service providing device 10 by a user using an away client device 20. The operation shown in FIG. 12 is different from that in FIG. 10 in that steps S258 through S265 are executed instead of steps S208 through S214. In FIG. 12, steps similar to those of FIG. 10 are designated by like step numbers, and an explanation thereof will thus be omitted.

In step S258, the client device 20C sends a use request to use a service to the relay device 30B. This use request includes the user ID of the user U1 and a service ID for identifying a service. The CPU 301 of the relay device 30B receives the use request from the client device 20C. In step S259, the CPU 301 determines whether or not an effective token corresponding to the user ID and the service ID included in the received use request is stored in the first cache table 311 of the relay device 30B. A determination as to whether or not the token is effective is made on the basis of the expiry date of this token stored in the first cache table 311.

If the token corresponding to the received use request is not stored in the first cache table 311, or even if it is stored, if it is not effective, the CPU 301 of the relay device 30B sends a request to obtain a token to the home relay device 30A of the user of the user ID included in the use request. That is, in step S260, the CPU 301 of the relay device 30B sends a request to obtain a token to the home relay device 30A of the user U1.

In step S261, the CPU 301 of the relay device 30A stores user information (or a token) corresponding to the user ID included in the request received from the relay device 30B in the cache management table 310. The CPU 301 of the relay device 30A also reads a token corresponding to the user ID included in the request received from the relay device 30B from the user management table 308. In step S262, the CPU 301 of the relay device 30A sends the read token to the relay device 30B.

The relay device 30B receives the token from the relay device 30A. In step S263, the CPU 301 of the relay device 30B sets the expiry date of the received token and stores it in the first cache table 311. The CPU 301 of the relay device 30B also stores home information indicating the home region of the received token in the first cache table 311. In step S264, the CPU 301 of the relay device 30B sends a use request to use a service to the service providing device 10 by using the received token. That is, the CPU 301 sends the received token and the use request received from the client device 20C in step S258 to the service providing device 10. The service providing device 10 receives the use request and token, and then determines by using the received token whether or not access to the service providing device 10 will be permitted. If it is determined that access to the service providing device 10 will be permitted, in step S265, the service providing device 10 performs processing in response to the received use request. For example, the service providing device 10 performs processing concerning a service according to the service type included in the received use request.

If it is determined in step S259 that an effective token is stored in the first cache table 311 of the relay device 30B, steps S260 through S263 are skipped. In this case, in step S264, the relay device 30B sends the token stored in the first cache table 311 and the use request to the service providing device 10.

2-6. Operation for Using Service in Away Region

The operation for using a service for which the maximum usage amount is set (hereinafter referred to as a "charged service") by a user using an away client device 20 will be described below.

Figure 13:
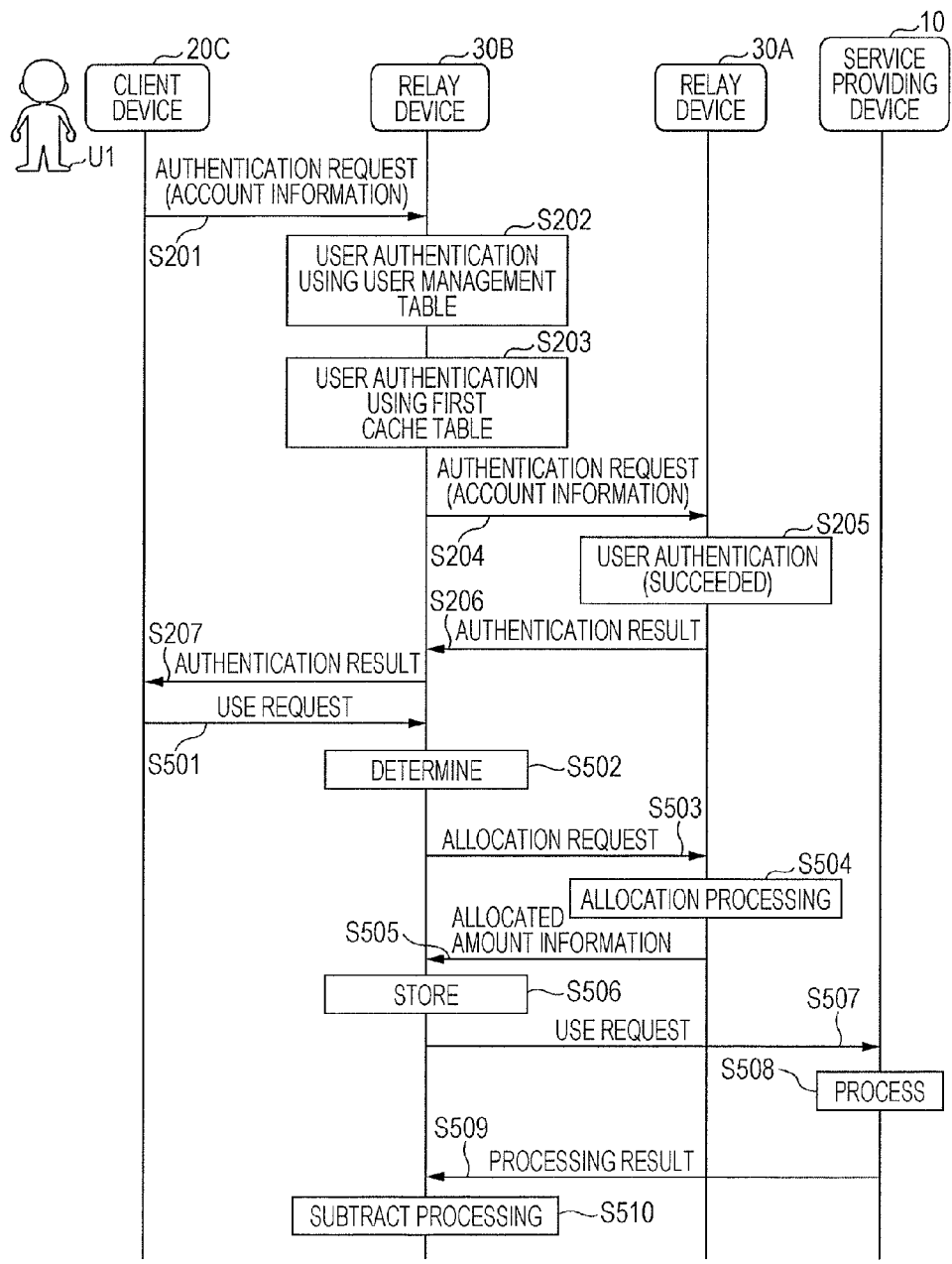

FIG. 13 is a sequence diagram illustrating an operation for using a charged service by a user using an away client device 20. In this example, a description will be given, assuming that the service use management table 309 of the relay device 30A has the content shown in FIG. 5. In the example shown in FIG. 13, for facilitating the understanding of the invention, processing concerning a token is not shown. The operation shown in FIG. 13 is different from that in FIG. 12 in that steps S501 through S510 are executed instead of steps S258 through S265. In FIG. 13, steps similar to those of FIG. 12 are designated by like step numbers, and an explanation thereof will thus be omitted.

In step S501, the client device 20C sends a use request to use a service to the relay device 30B. This use request includes the user ID of the user U1 and a service ID for identifying a service. The CPU 301 of the relay device 30B receives the use request from the client device 20C. In step S502, the CPU 301 of the relay device 30B determines whether or not effective cache information corresponding to the user ID and the service ID included in the received use request is stored in the second cache table 312 of the relay device 30B. A determination as to whether or not the cache information is effective is made on the basis of the expiry date of the allocated amount information stored in the second cache table 312.

If allocated amount information corresponding to the received use request is not stored in the second cache table 312, or even if it is stored, if it is not effective, the CPU 301 of the relay device 30B sends a request to allocate a usage amount of service to the home relay device 30A of the user of the user ID included in the use request. That is, in step S503, the CPU 301 of the relay device 30B sends a request to allocate a usage amount of service to the home relay device 30A of the user U1. In this example, the CPU 301 of the relay device 30B requests the relay device 30A to allocate a greater usage amount than the amount requested by the client device 20C. For example, if a request to use a character recognition service for 100 sheets has been received from the client device 20C, the CPU 301 of the relay device 30B sends a request to allocate 120 sheets for the character recognition service to the home relay device 30A. It may be possible that a processing request sent from the client device 20C include information indicating the use of the character recognition service but not include information concerning the usage amount of service. In this case, the CPU 301 of the relay device 30B may analyze document data sent together with the processing request sent from the client device 20C so as to specify the number of sheets to be subjected to processing of the character recognition service. The CPU 301 of the relay device 30B may then send a request to allocate a greater usage amount than a usage amount corresponding to the specified number of sheets to the home relay device 30A. If a processing request sent from the client device 20C includes neither of information concerning the usage amount nor document data to be subjected to processing of the character recognition service, may the CPU 301 of the relay device 30B send a request to allocate a predetermined usage amount to the home relay device 30A.

In step S504, the CPU 301 of the relay device 30A performs allocation processing for the usage amount of service in response to the allocation request received from the relay device 30B. More specifically, if the user ID and the service ID included in the allocation request are "user01" and "character recognition", respectively, and if the requested amount of allocation is "120 sheets", the CPU 301 of the relay device 30A subtracts 120 sheets from 150 sheets, which is the maximum usage amount, corresponding to "user01" and "character recognition" in the service use management table 309, and updates the maximum usage amount to 30 sheets. The CPU 301 also registers in "away allocation list" corresponding to "user01" and "character recognition" in the service use management table 309 that 120 sheets have been allocated to the relay device 30B.

In step S505, the CPU 301 of the relay device 30A sends allocated amount information indicating the allocated usage amount to the relay device 30B. If the requested usage amount exceeds the maximum usage amount stored in the service use management table 309 in step S504, the relay device 30A sends information that the allocation of a usage amount is not performed to the relay device 30B.

The CPU 301 of the relay device 30B receives the allocated amount information from the relay device 30A. In step S506, the CPU 301 of the relay device 30B stores the received allocated amount information in the second cache table 312.

In step S507, the CPU 301 of the relay device 30B sends a use request to use a service to the service providing device 10. The service providing device 10 receives the use request, and performs processing corresponding to the received use request in step S508. For example, the service providing device 10 performs processing concerning a service according to the service type included in the received use request. In step S509, the service providing device 10 sends a processing result to the relay device 30B.

The CPU 301 of the relay device 30B receives the processing result from the service providing device 10. In step S510, the CPU 301 subtracts a service usage amount indicated by the processing result from the usage amount registered in the second cache table 312 so as to update the registered usage amount.

2-7. Operation for Returning Allocated Usage Amount

The operation for returning a usage amount allocated to the away relay device 30B to the home relay device 30A from the away relay device 30B will be described below.

Figure 14:
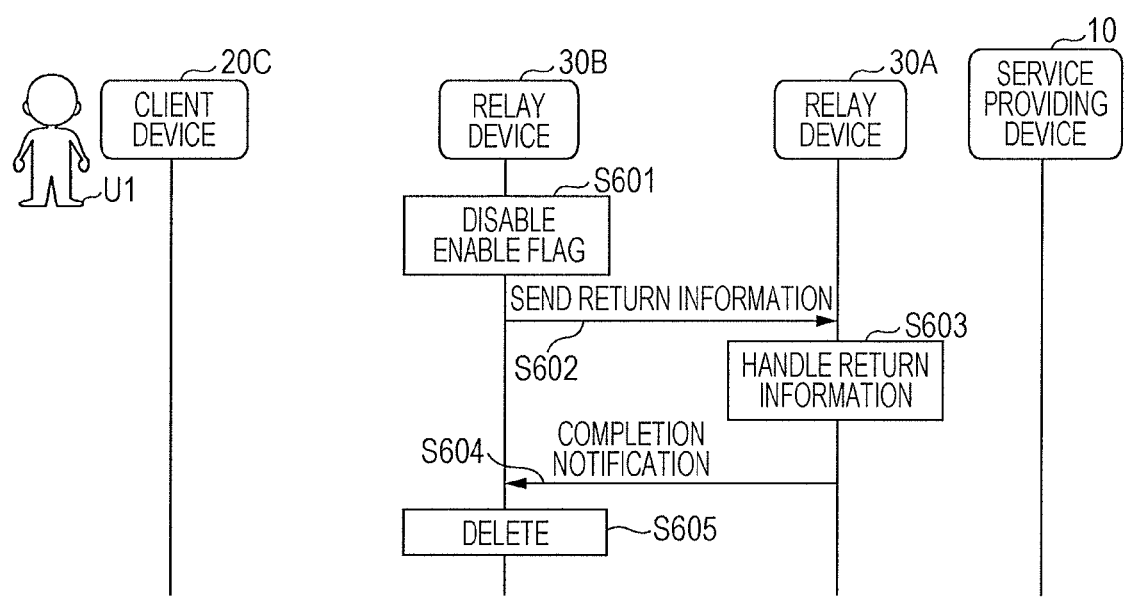

FIG. 14 is a sequence diagram illustrating an operation for returning allocated amount information. The CPU 301 of the away relay device 30B checks, on a regular basis, the expiry date of the allocated amount information stored in the second cache table 312 and the expiry date of the user information stored in the first cache table 311. If any one of the effective periods indicated by the expiry dates has expired, the CPU 301 of the relay device 30B starts return processing for allocated amount information. The return processing does not necessarily have to start at this time, but may start at another time, for example, it may start upon receiving a return request from the home relay device 30A.

In step S601, the CPU 301 of the relay device 30B disables an enable flag of allocated amount information for which the effective period indicated by the expiry date has expired or an enable flag of allocated amount information corresponding to user information for which the effective period indicated by the expiry date has expired. In step S602, the CPU 301 generates return information from the allocated amount information stored in the second cache table 312 and sends the generated return information to the home relay device 30A. This return information includes information indicating a service usage amount to be returned. As the return information, the remaining usage amount may be calculated by subtracting an amount used for a service in the away relay device 30B from a usage amount allocated to the relay device 30B. Alternatively, the total value of amounts used for a service may be used as the return information.

The relay device 30A receives return information from the relay device 30B. In step S603, the CPU 301 of the relay device 30A handles the return information by adding the remaining usage amount indicated by the return information to the maximum usage amount registered in the service use management table 309. Alternatively, the CPU 301 of the relay device 30A may handle return information by deducting the total value of the amounts used for a service indicated by the return information from the allocated usage amount and by adding the resulting usage amount to the maximum usage amount registered in the service use management table 309. Then, the CPU 301 of the relay device 30A deletes information concerning the relay device 30B registered in the away allocation list in the service use management table 309. In step S604, the relay device 30A sends a completion notification indicating that return processing has been completed to the relay device 30B.

The relay device 30B receives the completion notification from the relay device 30A. In step S605, the CPU 301 of the relay device 30B deletes the returned return information, that is, the allocated amount information for which the enable flag has been disabled in step S601, from the second cache table 312.

3. Modified Examples

The above-described exemplary embodiment is only an example of the present invention. The exemplary embodiment may be modified in the following manner. The following modified examples may be combined with each other.

3-1. First Modified Example

In the above-described exemplary embodiment, the away relay device 30B sends an authentication request to the other relay devices 30 (step S203 of FIG. 10), and determines that the relay device 30 that has sent an authentication result indicating that user authentication has succeeded to be the home relay device 30A. That is, the away relay device 30B has made a query to all of the other relay devices 30. However, the away relay device 30B may specify the home relay device 30A by a different approach.

In one approach, the CPU 301 of the away relay device 30B may make a query to other relay devices 30 which satisfy predetermined conditions concerning the distance from the relay device 30B (for example, other relay devices 30 which are positioned close to the away relay device 30B) and may specify the home relay device 30A in accordance with the query results. In this case, information indicating other relay devices 30 which satisfy predetermined conditions concerning the distance from the relay device 30B may be stored in a memory, such as the storage 304, in advance, and the CPU 301 of the relay device 30B may make a query on the basis of the information stored in the memory.

In another approach, in the home relay device 30A, information indicating regions where a user is likely to make a business trip may be stored in a memory for each user in advance, and the CPU 301 of the relay device 30A may make a query to the relay devices 30 in the regions where a user is likely to make a business trip indicated by the information stored in the memory. Alternatively, regions where a user is likely to make a business trip may be registered in the home relay device 30A in advance, and the home relay device 30A may inform the away relay device 30B that the home of this user is the region of the relay device 30A.

In another approach, mapping information indicating the association of organizations and regions may be stored in a memory of a relay device 30 in advance, and the CPU 301 of the away relay device 30B may refer to this mapping information so as to specify the home relay device 30A. In this case, the away relay device 30B specifies the organization of a user by referring to the user management table 308, and then specifies the region corresponding to the specified organization on the basis of the mapping information.

In another approach, a user may select the home of the user by operating the operation unit of a client device 20. In this case, the client device 20 sends home information indicating the selected home to the relay device 30 on the basis of the information output from the operation unit. The relay device 30 then specifies the home relay device 30A on the basis of the home information received from the client device 20.

In another approach, a table indicating the association between users and homes may be registered in the away relay device 30B in advance. Then, the away relay device 30B may refer to this table and specify the home relay device 30A.

3-2. Second Modified Example

The system 1 of the above-described exemplary embodiment includes the service providing devices 10A through 10C, client devices 20A through 20D, and relay devices 30A through 30C. The numbers of service providing devices 10, client devices 20, and relay devices 30 are not restricted to those of the system 1.

3-3. Third Modified Example

In updating processing for user information shown in FIG. 11, the relay device 30A may execute the following processing instead of step S403. The relay device 30A may send user information updated in step S404 to the away relay device 30B in which user information which has not been updated is stored, thereby informing the away relay device 30B that user information has been updated. In this case, upon receiving the updated user information, the away relay device 30B overwrites user information stored in the first cache table 311 with the received user information. The away relay device 30B may also extend the effective period of the updated user information.

3-4. Fourth Modified Example

In allocation processing in step S504 of FIG. 13, if the allocation amount requested by the relay device 30B is greater than the maximum usage amount registered in the service use management table 309, the CPU 301 of the relay device 30A may send a return request to another away relay device 30. In this case, if the amount returned from another away relay device 30 satisfies predetermined conditions, the CPU 301 of the relay device 30A may perform allocation processing for the relay device 30B.

3-5. Fifth Modified Example

In the processing shown in FIG. 13, when performing allocation processing in step S504, the CPU 301 of the home relay device 30A performs subtract processing for subtracting an allocated amount from the maximum usage amount stored in the service use management table 309. However, the time at which subtract processing is performed is not restricted to step S504. For example, instead of performing subtract processing in step S504, the CPU 301 of the home relay device 30A stores the allocated amount in a memory, and in step S603 of FIG. 14, the CPU 301 may subtract the value indicated by return information returned from the away relay device 30B from the allocated amount stored in the memory, and may subtract the calculation result from the maximum usage amount stored in the service use management table 309.

3-6. Sixth Modified Example

In the above-described exemplary embodiment, the program executed by the CPU 301 of the relay device 30 may be downloaded via a communication network, such as the Internet. This program may be provided after being stored in a computer readable recording medium, such as a magnetic recording medium (such as magnetic tape or a magnetic disk), an optical recording medium (such as an optical disc), a magneto-optical recording medium, or a semiconductor memory.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay device comprising:
a use request receiver configured to receive a use request to use a service to be provided by a service providing device from a client device;
a determiner configured to determine whether a user who requests the use request belongs to the relay device;
an allocation amount information obtainer configured to obtain, in a case in which the user belongs to the relay device, allocation amount information stored in the relay device;
an allocation request sender configured to send, in a case in which the user does not belong to the relay device, an allocation request to allocate a usage amount of the service based on a usage amount indicated by usage amount information specified by the use request received by the use request receiver to a different relay device;
an allocated amount receiver configured to receive allocated amount information indicating an allocated usage amount for the service sent from the different relay device in response to the allocation request;
a generator configured to generate return information from the allocated amount information received from the allocated amount receiver and a usage amount of the service; and
a return information sender configured to send the return information generated by the generator to the different relay device.

2. The relay device according to claim 1, wherein the allocation request sender sends request information requesting a usage amount greater than a usage amount indicated by the usage amount information included in the use request received by the use request receiver to the different relay device.

3. The relay device according to claim 1, further comprising:
a cache table configured to store the allocated amount information received by the allocated amount receiver from the different relay device.

4. The relay device according to claim 1, wherein the service providing device performs the service in compliance with the use request and the allocated amount information.

5. A relay device comprising:
a memory configured to store usage amount information indicating a maximum usage amount of a service;
a use request receiver configured to receive a use request to use a service to be provided by a service providing device from a client device;
a use request sender configured to send, in response to receiving the use request from the client device, a use request to a service providing device;
a determiner configured to determine whether a user who requests the use request belongs to the relay device;
an allocation request receiver configured to receive an allocation request to allocate a usage amount of service from a different relay device;
an allocated amount sender configured to send, in a case in which the user belongs to the relay device, allocated amount information indicating an allocated usage amount, which is the entirety or part of the maximum usage amount indicated by the usage amount information stored in the memory, to the different relay device in response to the allocation request received by the allocation request receiver;
a return information receiver configured to receive return information from the different relay device; and
a processor configured to update the usage amount information stored in the memory in accordance with the return information received by the return information receiver and a result of processing by the service providing device based on the use request.

6. The relay device according to claim 5, wherein:
the allocated amount sender performs a subtract operation for subtracting the allocated usage amount indicated by the allocated amount information from the maximum usage amount indicated by the usage amount information stored in the memory, and stores a usage amount obtained as a result of the subtract operation in the memory as the usage amount information; and
the processor adds a usage amount indicated by the return information received by the return information receiver to the maximum usage amount indicated by the usage amount information stored in the memory.

7. The relay device according to claim 5, wherein:
the allocated amount sender stores the allocated amount information in the memory; and
the processor performs a subtract operation for subtracting a usage amount indicated by the return information received by the return information receiver from the allocated usage amount indicated by the allocated amount information stored in the memory, and subtracts a usage amount obtained as a result of the subtract operation from the maximum usage amount indicated by the usage amount information stored in the memory.

8. The relay device according to claim 5, wherein the service providing device performs the service in compliance with the use request and the allocated amount information.

9. A system comprising:
a first relay device; and
a second relay device,
the first relay device including
a first use request receiver configured to receive a first use request to use a first service to be provided by a first service providing device from a first client device,
a first determiner configured to determine whether a first user who requests the first use request belongs to the first relay device;
an allocation amount information obtainer configured to obtain, in a case in which the first user belongs to the first relay device, first allocation amount information stored in the first relay device;
an allocation request sender configured to send, in a case in which the user does not belong to the first relay device, a first allocation request to allocate a first usage amount of the first service based on an amount indicated by first usage amount information specified by the first use request received by the first use request receiver to a first different relay device,
a first allocated amount receiver configured to receive first allocated amount information indicating a first allocated usage amount for the first service sent from the first different relay device in response to the first allocation request,
a generator configured to generate return information from the first allocated amount information received from the allocated amount receiver and the first usage amount of the first service, and
a return information sender configured to send the return information generated by the generator to the first different relay device,
the second relay device including
a memory configured to store second usage amount information indicating a maximum usage amount of a second service,
a second use request receiver configured to receive a second use request to use a second service to be provided by a second service providing device from a second client device;
a use request sender configured to send, in response to receiving the second use request from the second client device, a third use request to the second service providing device;
a second determiner configured to determine whether a second user who requests the second use request belongs to the second relay device
an allocation request receiver configured to receive a second allocation request to allocate a second usage amount of the second service from a second different relay device,
an allocated amount sender configured to send, in a case in which the second user belongs to the second relay device, second allocated amount information indicating a second allocated usage amount, which is the entirety or part of the maximum usage amount indicated by the second usage amount information stored in the memory, to the second different relay device in response to the second allocation request received by the allocation request receiver,
a return information receiver configured to receive second return information from the second different relay device, and
a processor configured to updates the second usage amount information stored in the memory in accordance with the second return information received by the return information receiver and a result of processing by the second service providing device based on the second use request.

10. The system according to claim 9, wherein:
the first different relay device is the second relay device; and
the second different relay device is the first relay device.

11. The system according to claim 9, wherein the first relay device further includes
a cache table configured to store the allocated amount information received by the allocated amount receiver from the first different relay device.

12. The relay device according to claim 9, wherein:
the first service providing device performs the first service in compliance with the first use request and the first allocated amount information, and
the second service providing device performs the second service in compliance with the second use request and the second allocated amount information.

13. A non-transitory computer readable medium storing a program causing a computer to execute a process, the process comprising:
receiving a use request to use a service to be provided by a service providing device from a client device;
determining whether a user who requests the use request belongs to a relay device;
obtaining, in a case in which the user belongs to the relay device, allocation amount information stored in the relay device;
sending, in a case in which the user does not belong to the relay device, an allocation request to allocate a usage amount of the service based on a usage amount indicated by usage amount information specified by the received use request to a different relay device;
receiving allocated amount information indicating an allocated usage amount for the service sent from the different relay device in response to the allocation request;
generating return information from the received allocated amount information and a usage amount of the service; and
sending the generated return information to the different relay device.

14. The non-transitory computer readable medium according to claim 13, the process further comprising:
providing the service by the service providing device in compliance with the use request and the allocated amount information.

15. A non-transitory computer readable medium storing a program causing a computer to execute a process, the computer including a memory that stores usage amount information indicating a maximum usage amount of a service, the process comprising:
receiving a use request to use a service to be provided by a service providing device from a client device;
sending, in response to receiving the use request from the client device, a use request to a service providing device;
determining whether a user who requests the use request belongs to a relay device;

receiving an allocation request to allocate a usage amount of service from a different relay device;

sending, in a case in which the user belongs to the relay device, allocated amount information indicating an allocated usage amount, which is the entirety or part of the maximum usage amount indicated by the usage amount information stored in the memory, to the different relay device in response to the received allocation request;

receiving return information from the different relay device; and updating the usage amount information stored in the memory in accordance with the received return information and a result of processing by the service providing device based on the use request.

16. The non-transitory computer readable medium according to claim 15, the process further comprising:

providing the service by the service providing device in compliance with the use request and the allocated amount information.

* * * * *